United States Patent
James

[15] 3,649,162
Mar. 14, 1972

[54] BISCATIONIC MONOAZO DYES FOR ACID-MODIFIED NYLON

[72] Inventor: Daniel Shaw James, Hockessin, Del.

[73] Assignee: E. I. du Pont de Nemours and Company, Wilmington, Del.

[22] Filed: July 27, 1970

[21] Appl. No.: 58,706

[52] U.S. Cl....................................8/41 B, 260/154, 260/157
[58] Field of Search.................8/41 A, 41 B; 260/154, 157

[56] References Cited

UNITED STATES PATENTS

| | | | |
|---|---|---|---|
| 3,078,137 | 2/1963 | Bavmann et al. | 8/57 |
| 3,338,660 | 8/1967 | Biedermann | 8/54 |
| 3,389,549 | 6/1968 | David | 57/140 |

Primary Examiner—George F. Lesmes
Assistant Examiner—M. B. Wittenberg
Attorney—Michael J. Bradley

[57] ABSTRACT

Red to rubine biscationic monoazo dyes having the formula

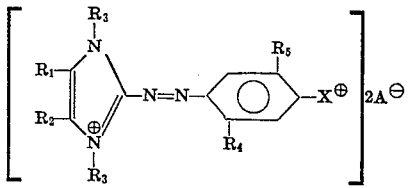

wherein
$R_1$ and $R_2$ = H, alkyl or phenyl
$R_3$ = alkyl or benzyl
$R_4$ = H, alkyl, alkoxy, Cl, NHCO alkyl or $NHCOC_6H_5$
$R_5$ = H, Cl, alkyl or alkoxy

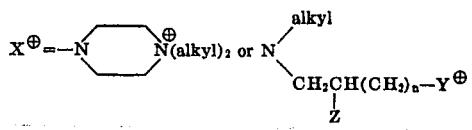

wherein $n = 0$ or $1$ $Z = H$ when $n = 0$ $Z = H$ when $n = 1$

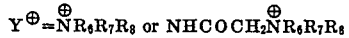

wherein $R_6$ = alkyl $R_7$ = alkyl or hydroxyalkyl $R_8$ = alkyl, hydroxyalkyl or benzyl or $R_7$ and $R_8$ together are piperidino or pyrrolidino $R_6$, $R_7$ and $R_8$ together or pyridinium $A^-$ is anion and alkyl = 1–4 carbon atoms are useful for dyeing nylon styling yarns, have bright shades with good buildup and lightfastness on acid-modified nylon with negligible affinity for unmodified nylons when dyed thereon at a pH of from about 6 to about 6.5.

4 Claims, No Drawings

BISCATIONIC MONOAZO DYES FOR ACID-MODIFIED NYLON

BACKGROUND OF THE INVENTION

Multicolored bulked continuous filament BCF nylon styling carpeting has grown rapidly in popularity since its introduction a few years ago. Such carpeting initially contained several polyamide modifications which differ from each other with respect to the concentration of free amine end groups in the fiber (e.g. U.S. Pat. No. 3,078,248 describes the preparation of polyamide fibers of varying amine end content). Since amine groups act as dye sites for acid dyes, these modified nylons vary in acid dye receptivity. Hence, when a carpet composed of three such nylons having low, medium and high amine end content (which may be termed light-, medium- and deep-dyeable nylon, respectively) is dyed with a suitable acid dye or dyes, a three-tone effect is produced. Greater versatility of shade is obtainable by using disperse dyes in addition to acid dyes. Disperse dyes are not site-dyeing (since they possess no ionic groups) and thus dye all nylon modifications of the kind described above to the same depth, irrespective of the amine-end concentration. To illustrate this point, one can visualize a tricomponent nylon carpet dyed first with a suitable red acid dye and then with a yellow disperse dye. The red dye will produce light, medium and deep red shades, respectively, on the three different kinds of nylon. The yellow disperse dye, however, will dye all three nylons to the same depth of shade. The resulting shades will be reddish-yellow, orange and scarlet, respectively.

With the introduction of "acid-modified" nylons (e.g. as in U.S. Pat. No. 3,184,436), the range of multicolored effects obtainable on BCF nylon styling carpeting was greatly increased. Acid-modified nylons, which contain sulfonic acid groups on the polymer chain, are dyeable with cationic dyes but have little or no affinity for acid dyes. Thus, a carpet containing two or three nylons of varying affinity for acid dyes and an acid-modified nylon which reserves (is not stained by) acid dyes can be dyed at will with any combination of shades, including primary colors (those colors that cannot be obtained by combining other colors) side by side on the same carpet. Dyeing methods have been developed so that such carpets can be dyed with acid and cationic dyes in a single dyeing operation. Thus, a blue acid dye and a red cationic dye (with a suitable dyebath additive to prevent coprecipitation of the dyes) will produce varying shades of blue on the acid dye-receptive nylons and a red shade on the acid-modified cationic dye-receptive nylon.

The choice of cationic dyes for acid-modified nylon in styling carpeting depends on two main considerations, namely, an adequate degree of fastness (particularly to light) on the acid-modified nylon and a lack of cross-staining on the unmodified nylons. The former consideration is self-explanatory, since the fastness requirements for carpet dyes are higher than for almost any other dye end-use; the latter consideration is important since cross-stains can have poor fastness properties and would tend to dull the shade of the acid dyes on the unmodified nylon components and minimize the color contrast between the different types of fiber.

It has been found that the staining of unmodified nylon with cationic dyes depends on the pH at which the dyes are applied to the substrate. Many commercial, monocationic dyes have satisfactory nonstaining characteristics on unmodified nylon at low pH (i.e. 4 or below). However, at the preferred dyeing pH range, for cationic dyes, of 6–6.5, staining becomes more apparent and, in most cases, is unacceptable for commercial use.

SUMMARY OF THE INVENTION

Nylon styling yarns containing acid-modified nylon and unmodified nylon yarns can be dyed in an aqueous dyebath at a pH of from about 6 to about 6.5 with red to rubine biscationic monoazo dyes having the formula

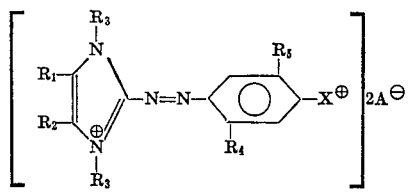

wherein
$R_1$ and $R_2$ = H, alkyl or phenyl
$R_3$ = alkyl or benzyl
$R_4$ = H, alkyl, alkoxy, Cl, NHCO alkyl or $NHCOC_6H_5$
$R_5$ = H, Cl, alkyl or alkoxy

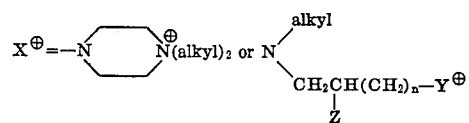

wherein
n = 0 or 1
Z = H when n = 0
Z = OH when n = 1

$$Y^\oplus = \overset{\oplus}{N}R_6R_7R_8 \text{ or } NHCOCH_2\overset{\oplus}{N}R_6R_7R_8$$

wherein
$R_6$ = alkyl
$R_7$ = alkyl or hydroxyalkyl
$R_8$ = alkyl, hydroxyalkyl or benzyl or
$R_7$ and $R_8$ together or pyridinium
$A^-$ is anion and
alkyl = one to four carbon atoms The dyes have excellent reserve of nonacid-modified nylon, deep dyeing characteristics on acid-modified nylon and excellent exhaust from the dyebath.

DESCRIPTION OF THE INVENTION

The dyes useful in this invention may be prepared by diazotizing an amine of the formula

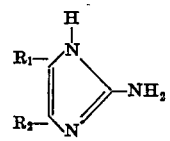

(where $R_1$ and $R_2$ are as defined above) in aqueous hydrochloric or sulfuric acid at about 0°–15° by addition of sodium nitrite. The diazonium salt is then coupled to an amine of the structure

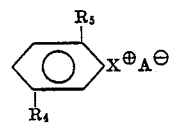

(where the symbols are as defined above) by adding the diazonium salt to an aqueous solution of the coupler, or vice versa, or by simply adding the pure coupler to the diazonium salt preparation. Coupling may be effected at room temperature or below, but preferably at 50°–20° C. The coupling reaction may be accelerated by raising the pH to about 3–5 with a suitable inorganic salt or base, such as an alkali metal acetate, bicarbonate, carbonate or hydroxide. Sodium acetate and sodium hydroxide are the preferred reagents, for economic reasons. Carbonates and bicarbonates are less suitable because of foaming caused by evolution of carbon dioxide.

Finally, the desired dye is produced by quaternization of the intermediate azo dye with any suitable quaternizing agent. Examples are alkyl chlorides, bromides or iodides; alkyl sulfates; benzyl chloride, bromide or sulfate and alkyl or benzyl p-toluenesulfonates. Alkyl radicals may contain up to four carbon atoms, but are preferably methyl or ethyl.

Alternatively, the diazonium salts described above may be coupled to the unquaternized form of the couplers, i.e. to compounds of the formula

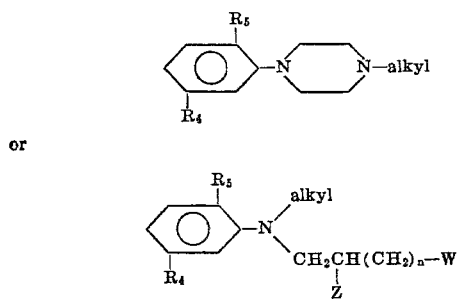

or where $W = NR_7R_8$ or $NHCOCH_2NR_7R_8$, the other symbols are as defined above.

Coupling may be effected as described above, the coupler either being dissolved in water by adding sufficient acid to protonate the pendant tertiary amine, or being added directly to the diazonium salt preparation. Subsequent quaternization produces the desired biscationic dyes.

The nature of the anion $A^-$ does not affect the excellent application and fastness properties of the subject dyes. The reasons for using one anion in preference to another are (a) economics and (b) ease and completeness of isolation of the dye. Anions may be introduced in various ways, for instance, in the acid used to perform the diazotization and coupling reactions (almost always hydrochloric acid), in the salt used to accelerate the coupling reaction, in the quaternizing agent (examples of which are given above) and in the salt used to precipitate the dye from solution prior to isolation. Possible salting agents include sodium chloride, sodium iodide, sodium fluoborate and zinc chloride. Arylsulfonates may also be used if low water solubility is required.

Examples of imidazoles that may be used to prepare dyes of this invention appear in Table 1.

Table 1

| $R_1$ | $R_2$ |
|---|---|
| H | H |
| H | $CH_3$ |
| $CH_3$ | $CH_3$ |
| H | $C_2H_5$ |
| $CH_3$ | $C_6H_5$ |
| $C_4H_9$ | $C_6H_5$ |
| $C_6H_5$ | $C_6H_5$ |

Methods of preparation of substituted 2-aminoimidazoles such as those appearing in Table 1 are known in the art.

For example, the preparation of 4-(or 5-)methyl-2-aminoimidazole by heating guanidine and propargyl bromide together in ethanol is disclosed in Japanese Pat. No. 24,885 (1963). The synthesis of 4,5-diphenyl-2-aminoimidazole and other derivatives, by heating aromatic α-hydroxyketones (benzoins) with 1,2-hydrazinedicarboxamidine in aqueous-ethanolic sodium hydroxide and reducing the resulting azo intermediates by catalytic hydrogenation to the desired products, is disclosed by A. Kreutzberger in J.O.C. 27 (1962) pp. 886–891. The preparation of 4,5-dimethyl- and 4-methyl-5-phenyl-2-aminoimidazoles and other derivatives, by reacting α-aminoketones with cyanamide in hot water at pH 4.5, is described by Lancini et al., J. Heterocyclic Chem., 3 (1966) pp. 152–4.

The couplers containing a pendant tertiary or quaternized amine group may be prepared by methods known in the art. For example, N-alkyl anilines, optionally substituted in the 2- and/or 5-positions, may be 1. reacted with ethylene oxide, giving the N-(β-hydroxyethyl) derivatives. Replacement of the hydroxyl group with a halogen atom and subsequent addition of a secondary or tertiary amine gives pendant tertiary amine or quaternary ammonium salts, respectively, 2. reacted sequentially with ethyleneimine, chloroacetyl chloride and a secondary or tertiary amine, giving pendant tertiary amine or quaternary ammonium salts, respectively, 3. reacted sequentially with epichlorohydrin and a secondary or tertiary amine, or, 4. reacted with epichlorohydrin, then with ammonia to replace the terminal chlorine with a primary amine group, and then sequentially with chloroacetyl chloride and a secondary or tertiary amine.

Other useful couplers may be prepared by condensing chlorobenzene, optionally substituted in the 2- and/or 5-positions, with piperazine and alkylating or quaternizing with an alkyl halide or sulfate. Examples of couplers that are useful for preparing dyes of this invention are given in Table 2.

TABLE 2

| $R_4$ | $R_5$ | $X^\oplus$ |
|---|---|---|
| H | H | $-N\begin{smallmatrix}CH_3\\C_2H_4\overset{\oplus}{N}(CH_3)_3\end{smallmatrix}$ |
| $CH_3$ | $OCH_3$ | $-N\begin{smallmatrix}C_2H_5\\C_2H_4\overset{\oplus}{N}(C_2H_5)_2CH_3\end{smallmatrix}$ |
| Cl | H | $-N\begin{smallmatrix}C_2H_5\\C_2H_4N(C_2H_4OH)_2CH_3\end{smallmatrix}$ |
| $C_2H_5$ | H | $-N\begin{smallmatrix}CH_3\\C_2H_4NHCOCH_2\overset{\oplus}{N}(C_6H_5)\end{smallmatrix}$ |
| $OCH_3$ | H | $-N\begin{smallmatrix}C_3H_7\\C_2H_4N(CH_3)_2CH_2C_6H_5\end{smallmatrix}$ |
| $OC_4H_9$ | $OC_4H_9$ | $-N\begin{smallmatrix}C_4H_9\\C_2H_4NHCOCH_2\overset{\oplus}{N}(C_3H_7)_3\end{smallmatrix}$ |
| H | H | $-N\diagup\hspace{-2pt}\diagdown\overset{\oplus}{N}(CH_3)_2$ |
| $OCH_3$ | H | $-N\diagup\hspace{-2pt}\diagdown\overset{\oplus}{N}(C_3H_7)_2$ |
| $CH_3$ | H | $-N\diagup\hspace{-2pt}\diagdown\overset{\oplus}{N}(CH_3)_2$ |

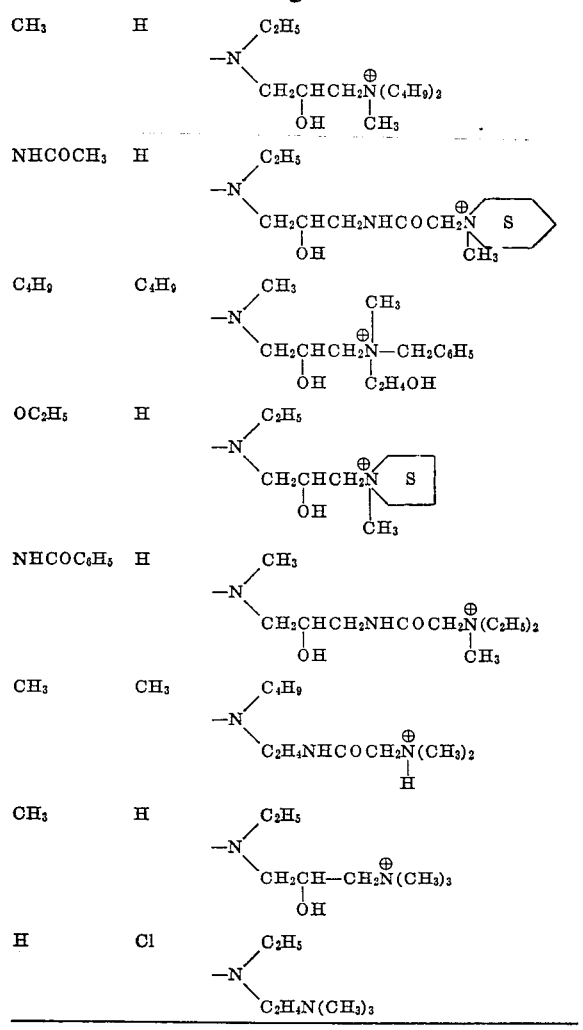

The biscationic monoazo dyes of this invention have been found to have good exhaust and lightfastness on acid-modified BCF nylon fibers. Such polymers are described, for instance, in U.S. Pat. No. 3,184,436 and contain sulfonate groups along the polymer chain which act as dye sites for basic or cationic dyes. The instant dyes have also been found to display an almost total lack of affinity for unmodified nylon fibers under neutral to weakly acidic conditions. In other words, at pH 6–6.5, the biscationic dyes almost completely reserve nylon fibers which do not contain sulfonate groups. This behavior differs from that of known red monocationic azo dyes, which tend to stain unmodified nylon under near-neutral conditions and which display good reserve only under more acidic conditions (i.e. pH 4 or below).

The importance of these observations lies in the fact that nylon styling carpeting, which contains acid-modified and unmodified nylons, is piece-dyed most satisfactorily at pH 6–6.5. Acid and cationic dyes are applied to the carpeting from a single dyebath, which contains an additive to prevent coprecipitation of the oppositely charged dye molecules. There are several reasons why neutral to weakly acidic conditions are preferred for this dyeing procedure.

a. Although cationic dyes generally reserve unmodified nylons more efficiently at lower pH, they do not exhaust as well from the dyebath onto acid-modified nylon.
b. Acid dyes generally exhaust more efficiently at lower pH, but suffer a decrease in levelness on unmodified nylon and tend to stain acid-modified nylon.
c. Styling carpet that has a jute backing undergoes increased staining of the nylon by impurities in the jute with increasing acidity, causing dulling of dye shade and deterioration of dye fastness properties.

At neutral to weakly acidic conditions, cationic dyes may be applied to nylon styling carpet in conjunction with neutral-dyeing acid dyes, which have satisfactory exhaust and levelness under these conditions. It has now been discovered that the biscationic dyes described herein above have significantly better nonstaining properties on unmodified nylon at pH 6–6.5 than any known commercial red cationic dye.

Although biscationic dyes have been disclosed in the patent literature for several years for use on various substrates, particularly for acid-modified acrylic fibers, biscationic monoazo dyes like those disclosed in the present invention were found to have very limited utility on acrylics (such as those disclosed in U.S. Pat. No. 2,837,500 and U.S. Pat. No. 2,837,501) because of low affinity and poor buildup on the substrates. Much the same thing was found to be true of acid-modified polyester (such as is disclosed in U.S. Pat. No. 3,018,272). Thus, it was totally unexpected to find that the biscationic dyes of this invention have entirely adequate buildup on acid-modified nylon, producing deep red to rubine shades thereon.

Commercial nylon styling carpet usually contains acid-modified nylon and from two to four unmodified nylons of varying acid dye receptivity which are tufted onto a backing in a random pattern to give the desired styling effects.

In order to evaluate cationic and acid dyes for this end-use, however, a test carpeting is used in which the various nylons are tufted onto a backing in discreet bands. The instant dyes were evaluated on a test carpet with the following specifications: five bands of trilobal, jet-bulked BCF nylon yarns, spun from the nylon flake, are tufted onto a nonwoven polypropylene backing, each band being six tufts in width. The first band is acid-modified, 1,300 denier BCF nylon (such as that described in U.S. Pat. No. 3,184,436). The other four bands are unmodified, 3,700 denier BCF nylons which have progressively increasing acid dye receptivity by virtue of an increasing amine-end content, which ranges from 5 to more than 100 gram-equivalents of free amine ends per $10^6$ grams of polymer. The specific amine-end range for each band is as follows:

1. 5–25 gram-equivalents: "light-dyeable" with acid dyes
2. 25–55 gram-equivalents: "medium-dyeable" with acid dyes
3. 55–100 gram-equivalents: "deep-dyeable" with acid dyes
4. 100–120 gram-equivalents: "ultradeep-dyeable" with acid dyes The deep-dyeing nylons (3') and (4) are disclosed in U.S. Pat. No. 3,078,248.

The carpeting is dyed by the procedure used for commercial styling carpet, which can be dyed with acid and cationic dyes in the same dyebath by using as a dyeing assistant a sulfobetaine of the general structure

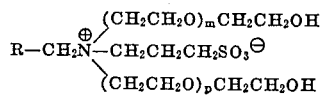

where
R = aliphatic hydrocarbon radical of 7–17 carbon atoms
m = 0–3
p = 0–3
(m+p) = <4

The preparation of these compounds is described in U.S. Pat. No. 3,280,179. Their utility in this particular end-use is disclosed in the defensive publication dated 4-29-69, of Robbins, Ser. No. 634,477. The functions of the sulfobetaine additive are to prevent coprecipitation of the acid and cationic dyes, to enhance the levelness of both classes of dye without suppressing buildup and to minimize cross-staining.

Piece dyeing is carried out at temperatures above 70° C. and preferably near the boil (95°–100° C.). Lower temperatures cause inferior exhaust and poor contrast through cross-staining. The pH of the dyebath may be anywhere from 3 to 9, but the most favored pH range is 6–6.5, for reasons given earlier in the discussion.

The sulfobetaine dyeing assistant may be used in amounts as low as 0.05% of the weight of the fiber being dyed, but the best results are obtained with 0.2–0.3%. Amounts in excess of 0.5% of the weight of the fiber have led to an increase in cross-staining.

The dyeing procedure is advantageously preceded by a bleach scour, as described in Example 8a, in order to obtain maximum shade brightness and contrast.

Finally, dyeing is usually followed by conventional rinse and drying steps. Conventional fishing, drying, latexing, and double backing application may be performed by customary means.

The aforementioned dyeing procedure may be adapted for the continuous dyeing of styling carpet, a comparatively new technique which is referred to in "Melliand Textilberichte," 48, 415–448 (Apr., 1967). Continuous dyeing is taught as being related to piece dyeing in that is is an aqueous process, but a. at very low bath ratios, i.e., 5:1 instead of 30:1 to 50:1, and b. the rate of fixation is much faster, since temperatures near the boil are attained more quickly in a steamer than in heating up a beck.

Cationic and acid or direct dyes may also be printed onto nylon styling carpeting, with excellent results.

Although the discussion has been devoted up to this point to styling carpeting, there are other areas in which BCF nylon styling yarns may be effectively used, such as upholstery and accent or throw rugs. The dyed acid-modified nylon of this invention would be applicable to these end-uses as well as for carpeting. The dyeing of these items may be carried out by the same means as that described for carpeting, using suitable equipment. Thus, carpeting is usually dyed in becks; upholstery is usually dyed in jigs; accent or throw rugs are usually dyed in paddle machines.

Evaluation of the instant dyes was carried out by dyeing them singly onto nylon test carpeting as described above, in the absence of any acid dyes. In this way, the degree of cross-staining on the unmodified nylons is readily apparent. Staining occurs most readily on the unmodified band containing the least number of free amine ends, since this nylon contains the highest density of carboxylic acid end groups, which can act as dye sites for cationic dyes. Staining by cationic dyes can be induced on the "deep-dyeable" and "ultradeep-dyeable" nylons by raising the dyeing pH, or by suitable choice of dye. However, the staining of the "light-dyeable" and "medium-dyeable" bands would then be so bad as to be quite unacceptable. A reasonable candidate will barely stain the first band and will leave the higher amine-end nylons untouched. Example 11 illustrates some typical results achieved by the instant dyes and compares them with a structurally related, monocationic dye and a commercially available monocationic red azo dye.

The preparation of the dyes of this invention may be illustrated by the following examples. Parts are given by weight.

EXAMPLE 1 a. A solution of 18.5 parts of bis(2-aminoimidazolium)-sulfate in 100 parts of water and 81 parts of 10N-hydrochloric acid was cooled to 5°–10° C. and treated with 36.5 parts of 5N-sodium nitrite solution. After stirring for 30 minutes at 5°–10 C., excess nitrite was destroyed with sulfamic acid.

The diazo solution was then added over a 40-minute period to a solution of 33 parts of N-ethyl-N-[2-(N,N-diethylamino)ethyl]aniline in 100 parts of water containing enough acetic acid to give a solution of pH 4–5, at 5°–10° C. The pH was maintained at 3.5–4 during the coupling reaction by addition of 30% sodium hydroxide solution. The mixture was then allowed to warm up to room temperature while stirring over a period of 2 hours. It was then warmed to 35° C. and 38.5 parts of sodium iodide were gradually added. An oily substance was precipitated, which crystallized on stirring overnight. The crystals were isolated by filtration and reslurried in isopropanol. Filtration yielded the solids, which were washed with isopropanol and reslurried in 5% sodium iodide solution. The material was reisolated by filtration, washed with 5% sodium iodide and then with isopropanol, and dried. Yield: 19 g. The material had an absorptivity of 63.2 liters gram$^{-1}$ cm.$^{-1}$ at 457 $\mu$ (in dimethylacetamide:water = 4:1). The structure of the intermediate is

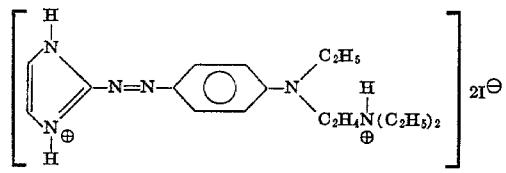

b. A mixture of 15 parts of the intermediate from (a) above 200 parts of isopropanol, 30 parts of methyl iodide and 9.4 parts of anhydrous sodium carbonate were heated to the reflux temperature for 6 hours. The reaction mixture was allowed to cool to room temperature by stirring overnight. The solids were isolated by filtration, washed with isopropanol, reslurried in 10% sodium iodide solution, reisolated by filtration, washed with 10% sodium iodide and then with isopropanol and dried. The dye had an absorptivity of 71.8 liters gram$^{-1}$ cm.$^{-1}$ at 515 $\mu$.

Found: C, 38.4, 38.0; H, 5.8, 5.7; total N, 13.3, 13.2; Azo N, 4.5, 4.5. Calc'd. for $C_{20}H_{34}I_2N_6$: C, 39.2; H, 5.6; total N, 13.7; Azo N, 4.6. The structure of the dye is

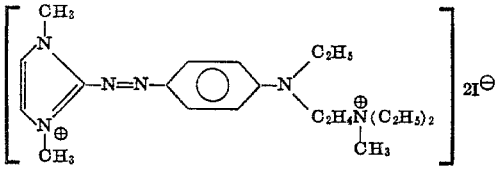

EXAMPLE 2 a. 12.5 Parts of bis(2-aminoimidazolium)sulfate were diazotized in the manner described in Example 1 and added over a ½-hour period to a solution of 24 parts of [2-(N-ethylanilino)ethyl]trimethylammonium chloride in 60 parts of water which had been precooled to 5°–10° C. The pH was maintained at 4–4.5 by addition of sodium acetate. After stirring for 1 hour at 5°–10° C., the reaction mixture was allowed to warm-up to room temperature with stirring. It was then heated to 40°–45° C. and treated with 36 parts of sodium iodide. The product precipitated from solution. After stirring the reaction mass overnight at room temperature, the solids were isolated by filtration and reslurried in turn in isopropanol and then in 5% sodium iodide solution, as described in Example 1(a). After isolating, washing with 5% sodium iodide and isopropanol and drying, 21 parts of product were obtained, having an absorptivity of 56.6 liters gram$^{-1}$ cm.$^{-1}$ at 450 $\mu$. The structure of the intermediate is

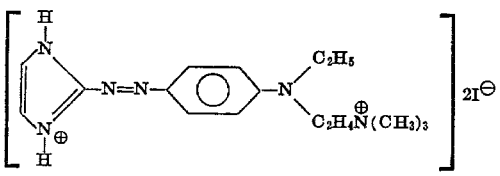

b. A mixture of 20 parts of the intermediate from (a) above, 15.2 parts of methyl iodide, 5.7 parts of anhydrous sodium carbonate and 120 parts of isopropanol was heated to the reflux temperature for 10 hours. After allowing the reaction mixture to cool to room temperature, the solids were isolated by filtration. They were washed with isopropanol, reslurried in 20% sodium iodide solution, reisolated, washed with 20% sodium iodide and then with isopropanol, reslurried in isopropanol, reisolated, washed with isopropanol and dried. Yield: 18.9 parts of a dark, reddish-brown powder with an absorptivity of 72.2 liters gram$^{-1}$ cm.$^{-1}$ at 515 $\mu$.

Found: C, 36.5, 36.5; H, 5.2, 5.3; total N, 14.0, 14.0; Azo N, 4.6, 4.9. Cald'd. for C$_{18}$H$_{30}$I$_2$N$_6$: C, 37.0; H, 5.2; total N, 14.3; Azo N, 4.8.

The structure of the dye is

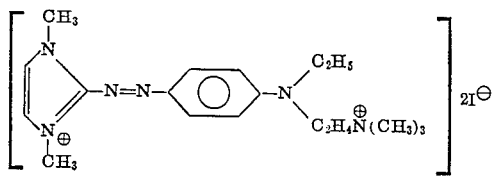

EXAMPLE 3 a. 12.5 Parts of bis(2-aminoimidazolium)sulfate were diazotized and coupled to 23 parts of N-ethyl-N-[2-(N,N-diethylamino)ethyl]-m-toluidine in the manner described in Example 1a. Yield: 38.7 parts, having an absorptivity of 46.8 liters gram$^{-1}$ cm.$^{-1}$ at 465 $\mu$. The structure of the intermediate is

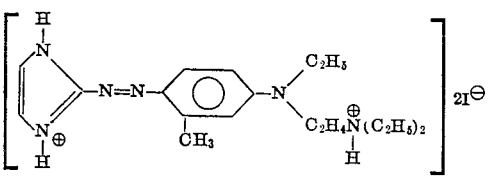

b. Quaternization of 22.5 parts of the intermediate of (a) above with methyl iodide was carried out by the procedure described in Example 1b. Yield: 19.6 parts, having an absorptivity of 77.5 liters gram$^{-1}$ cm.$^{-1}$ at 525 $\mu$.

Found: C, 40.7, 40.8; H, 5.9, 5.8; total N, 13.4, 13.4; Azo N, 4.7, 4.9. Calc'd. for C$_{21}$H$_{36}$I$_2$N$_6$: C, 40.3; H, 5.8; total N, 13.4; Azo N, 4.5.

The structure of the dye is

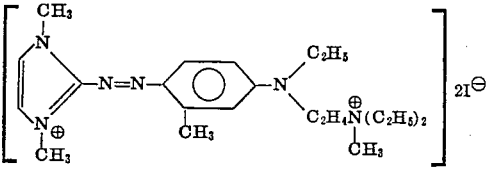

EXAMPLE 4 a. 12.5 Parts of bis(2-aminoimidazolium)sulfate were diazotized and coupled to 26 parts of N-ethyl-N-[3-(N,N-diethyl-amine)-2-hydroxypropyl]-m-toluidine by the procedure described in Example 1a. Yield: 38.9 parts, having an absorptivity of 59.9 liters gram$^{-1}$ cm.$^{-1}$ at 472 $\mu$. The structure of the intermediate is

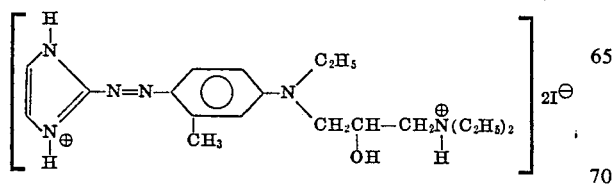

b. Quaternization of 22.5 parts of the intermediate from (a) above with methyl iodide, by the procedure of Example 1b, yielded 24.7 parts of a dark red solid having an absorptivity of 77.0 liters gram$^{-1}$ cm.$^{-1}$ at 537 $\mu$.

Found: C, 39.6, 39.3; H, 5.5, 5.9; total N, 12.4, 12.3; Azo N, 4.3, 4.4. Calc'd. for C$_{22}$H$_{38}$I$_2$N$_{60}$: C, 40.4; H, 5.9; total N, 12.8; Azo N, 4.3.

The structure of the dye is

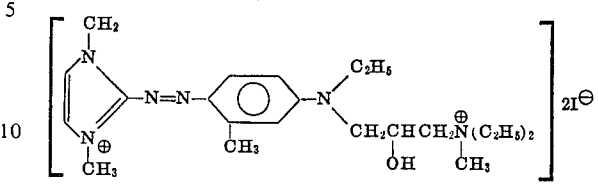

EXAMPLE 5

5.3 Parts of bis (2-aminoimidazolium)sulfate were diazotized and coupled to 12.8 parts of [2-(N-ethyl-m-toluidino)-ethylcarbamoylmethyl]trimethylammonium chloride in the manner of Example 1a, and then quaternized with methyl iodide in the manner of Example 1b. 17.4 Parts of an olive-green powder were obtained, having an absorptivity of 78.3 liters gram$^{-1}$ cm.$^{-1}$ at 536 $\mu$.

Found: C, 39.9, 39.5; H, 5.2, 5.7; N, 15.0, 14.9. Calc'd. for C$_{21}$H$_{35}$IN$_{70}$: C, 38.5; H, 5.3; N, 15.0.

The structure of the dye is

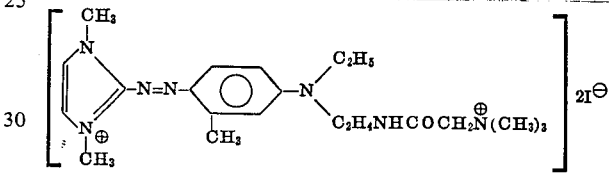

EXAMPLE 6 a. 10.6 Parts of 2-aminoimidazolium sulfate were diazotized by the procedure of Example 1a. The diazonium salt was added over a period of 15–20 minutes to a solution of 25.4 parts of N-phenyl-N', N'-dimethylpiperazinium iodide (prepared by heating N-phenylpiperazine with excess methyl iodide and sodium carbonate in isopropanol) in 150 parts of water and 12 parts of 10N-hydrochloric acid which had been precooled to 10° C. Sodium carbonate was added during the coupling procedure to maintain the pH at about 2. The reaction mixture was stirred for 2 hours at 10° C. and then allowed to warm up to room temperature. The pH was adjusted to 4–4.5 with 30% sodium hydroxide solution and 35 parts of sodium iodide were added. The mixture was stirred overnight and the solids were isolated by filtration. The orange-brown solids were washed with 5% aqueous sodium iodide and then with isopropanol and dried. The dye had an absorptivity of 49.6 liters gram$^{-1}$ cm.$^{-}_1$ at 403 $\mu$. Based on the above procedure, the structure of the dye is

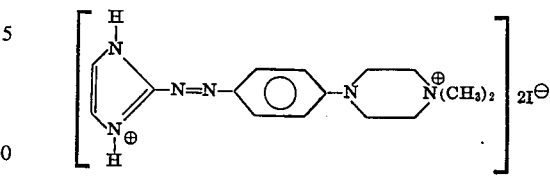

b. The intermediate from (a) above was methylated by a procedure similar to that described in Example 1b. The resulting dye had an absorptivity of 60 liters gram$^{-1}$ cm.$^{-1}$ at 495 $\mu$.

Found: C, 35.7, 35.6; H, 5.0, 4.9; Azo N, 4.7, 4.7. Calc'd. for C$_{17}$H$_{26}$I$_2$N$_6$: C, 35.9; H, 4.6; Azo N, 4.9.

The structure of the dye is

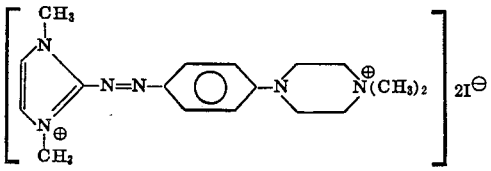

EXAMPLE 7

To Prepare 2-Imidazolium Sulfate

To a slurry of 200 parts of S-methylisothiourea sulfate in 350 parts of water was added 212 parts of aminoacetaldehyde diethyl acetal. The flask was fitted with an air condenser, which was topped by a tube leading to a trap cooled in dry ice-acetone to catch the methyl mercaptan evolved. The reaction flask was gently warmed on the steam bath such that $CH_3SH$ evolution remained under control.

After the gas evolution abated ($\approx$15-25 min.), the mixture was heated on the steam bath for an additional 15 minutes, cooled, and concentrated to a viscous oil under partial vacuum. This oil was taken up in 160 parts of methanol and treated with acetone to give 230 parts of product as fluffy colorless crystals, m.p. 150°–152° C. The mother liquors were concentrated to a viscous oil, taken up in methanol and again treated with acetone to give a second crop of 94 parts for a total of 324 parts (91%) of N-(2,2-diethoxyethyl)guanidinium sulfate.

A flask fitted with an air condenser and containing 100 parts of N-(2,2-diethoxyethyl)guanidinium sulfate and 61 parts of 37% hydrochloric acid was heated vigorously on a steam bath for 15 minutes with occasional swirling. Without cooling the mixture, 250 parts of water were added and the resulting solution concentrated in vacuo to a viscous oil. This was taken up in 250 parts of water, concentrated to an oily crystalline mass, taken up in 45 parts of absolute ethanol and treated with dry acetone to give 27.5 parts of 2-aminoimidazolium sulfate.

The mother liquor and acetone washings were concentrated to dryness, taken up in 37 parts of 37% hydrochloric acid, heated for 15 minutes on the steam bath, and the workup procedure repeated to give 16.4 parts of product for a total of 43.9 parts (75%) of 2-aminoimidazolium sulfate, m.p. 270° C. (dec.).

The following examples illustrate the dyeing methods for banded test carpet prepared as described on pages 15-16 above. In order to demonstrate the reserve of the biscationic dyes on unmodified nylon, they were dyed in the absence of acid dyes onto the banded nylon carpeting.

EXAMPLE 8

Dyeing of Banded BCF Nylon Carpeting
a. Bleach Scour

100 Parts of the banded carpeting described above were heated for 5 minutes at 80° F. in 4,000 parts of water containing

| | |
|---|---|
| sodium perborate | 4 parts |
| trisodium phosphate | 0.25 part |
| a sulfobetaine* | 0.5 part |

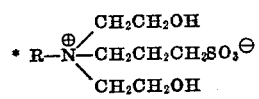

where R =
$C_{16}$ alkyl ($\approx$30%)
$C_{18}$ alkyl ($\approx$30%)
$C_{18}$ monounsaturated ($\approx$40%).

The temperature was raised to 160° F. for 15 minutes and the carpet rinsed in water at 100° F.
b. Dyeing Procedure The carpeting was added to 4,000 parts of water containing

| | |
|---|---|
| the aforementioned sulfobetaine | 1 part |
| the tetrasodium salt of ethylenediamine tetraacetic acid | 0.25 part |
| tetrasodium pyrophosphate | 0.2 part |

The dyebath was adjusted to pH 6 with monosodium phosphate and the temperature raised to 80° F. for 10 minutes. 0.05 Part of the dye of Example 1 was added and, after holding the dyebath at 80° F. for 10 minutes, the temperature was raised at ca. 2° F. per minute to 210° F. and held at this temperature for 1 hour. The carpeting was rinsed in cold water and dried. The acid-modified band was dyed a deep red shade. The unmodified bands were negligibly stained.

EXAMPLE 9

Printing of BCF Nylon Styling Carpeting

A sample of nylon styling carpeting containing acid-modified, medium-dyeable and ultradeep-dyeable nylons tufted in a random pattern on a nonwoven polypropylene backing was printed with a mixture containing

| | |
|---|---|
| the cationic dye of Example 2 | 5 parts |
| the sulfobetaine described in Example 8 | 0.5 part |
| glacial acetic acid | 5 parts |
| carrageenin thickener | to give the desired viscosity |
| water | to 100 parts |

The carpeting was steamed at 212°–220° F. for 10 minutes, rinsed, scoured for 15 minutes at 160° F. in a 0.03% aqueous solution of the condensation product of 20 moles of ethylene oxide with 1 mole of $C_{18}$ alcohol, rinsed and dried. The acid-modified nylon fibers were dyed a deep red shade. The unmodified fibers had a negligible stain.

EXAMPLE 10

Continuous Dyeing of Nylon Styling Carpeting

Using Kusters Equipment as described in "Textile Chemist and Colorist" Jan. 14, 1970, pp. 6–12, nylon styling carpeting as described in Example 8 above was run through a wet-out bath at 80° F. containing

| | |
|---|---|
| an organic alcohol extended with ethylene oxide | 1.5 g./l. |
| a sulfated polyglycol ether | 0.6 g./l. |

Pickup was about 80%. The carpeting was then continuously treated with an aqueous dyebath composition containing

| | |
|---|---|
| the dye of Example 3 | 5 g./l. |
| an organic alcohol extended with ethylene oxide | 0.25 g./l. |
| a sulfated polyglycol ether | 1.25 g./l. |
| a purified natural gum ether | 2 g./l. |
| the sulfobetaine described in Example 8 | 5 g./l. |
| acetic acid | 3 g./l. |
| monosodium phosphate | to adjust the pH to ca. 5 |

The dyebath temperature was 80° F. Pickup was about 200%. The carpeting was then run through a steamer at 212° F., in which the dwell time was 8 minutes. The carpeting was rinsed thoroughly and dried. The acid-modified nylon fibers were dyed a deep bluish-red shade; the unmodified fibers were negligibly stained.

EXAMPLE 11

Evaluation of Cross-Staining

Samples of banded nylon carpeting were dyed, according to the procedure described in Example 8, with
a. the dyes of Examples 1-6,
b. a monocationic azo dye of the structure

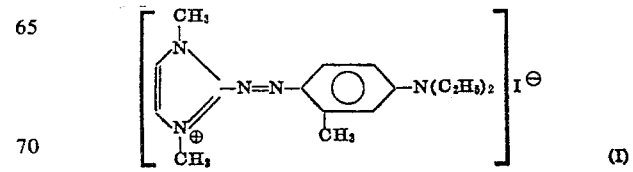

and
c. a commercially available red, C.I. 11085 (C.I. Basic Red 18) having the structure

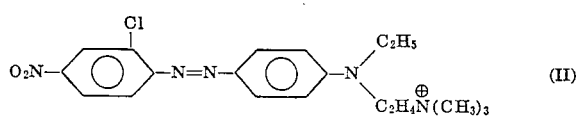

(II)

The strength of the dyeings was equivalent to 0.1% of the crude dye by weight on the acid-modified band of the test carpet.

The results are given in Table 3.

Table 3

| Dye | Shade on acid-modified nylon | Staining on "light-dyeable" nylon | Light-fastness on acid-modified nylon (80 hours xenon arc fade ometer) |
| --- | --- | --- | --- |
| Example 1(b) | red | 5–4 | 4W |
| Example 2(b) | red | 5–4 | 4 Bl, W |
| Example 3(b) | bluish-red | 5–4 | 5–4 Bl, W |
| Example 4(b) | rubine | 5–4 | 5 |
| Example 5 | bluish-red | 5–4 | 4W |
| Example 6 | reddish-orange | 5–4 | 3W, 2Br, D |
| I | bluish-red | 2 | 5–4Y, W |
| II | red | 3 | 3W, VMD |

The numbers given in Table 3 correspond to the Gray Scale ratings given in the Manual of the American Association of Textile Chemists and Colorists and have the following significance:

```
5 = negligible or no change (or stain)
4 = slight change (or stain)
3 = noticeable change (or stain)
2 = considerable change (or stain)
1 = much change (or stain)
Bl = bluer
W = weaker
Br = browner
D = duller
VMD = very much duller
Y = yellower
```

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. In a process for dyeing nylon styling yarns comprising contacting said yarns with a dye dispersed in an aqueous dyebath having a pH of from 3 to 9, the improvement comprising using a biscationic monoazo dye having the formula

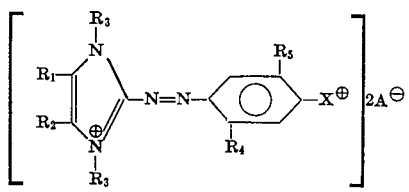

wherein
$R_1$ and $R_2 = $ H, alkyl or phenyl
$R_3 = $ alkyl or benzyl
$R_4 = $ H, alkyl, alkoxy, Cl, NHCO alkyl or $NHCOC_6H_5$
$R_5 = $ H, Cl, alkyl or alkoxy

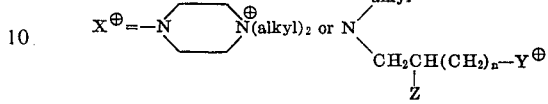

wherein
$n = 0$ or 1
$Z = $ H when $n = 0$
$Z = $ OH when $n = 1$

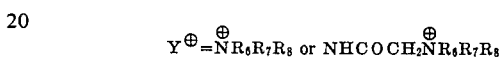

wherein
$R_6 = $ alkyl
$R_7 = $ alkyl or hydroxyalkyl
$R_8 = $ alkyl, hydroxyalkyl or benzyl or
$R_7$ and $R_8$ together are piperidino or pyrrolidino
$R_6$, $R_7$ and $R_8$ together are pyridinium
$A^{\ominus}$ is anion and
alkyl = one to four carbon atoms
at a pH of from about 6 to about 6.5.

2. The improved process of claim 1 in which $R_1 = $ H, $R_2 = $ H, $R_3 = CH_3$, $R_4 = $ H, $R_5 = H$ and

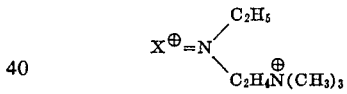

3. The improved process of claim 1 in which $R_1 = $ H, $R_2 = $ H, $R_3 = CH_3$, $R_4 = CH_3$, $R_5 = $ H and

4. The improved process of claim 1 in which $R_1 = $ H, $R_2 = $ H, $R_3 = CH_3$, $R_4 = CH_3$, $R_5 = $ H and

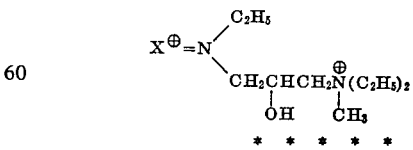

* * * * *

PO-1050
(5/69)

UNITED STATES PATENT OFFICE
CERTIFICATE OF CORRECTION

Patent No. 3,649,162              Dated March 14, 1972

Inventor(s) Daniel Shaw James

It is certified that error appears in the above-identified patent and that said Letters Patent are hereby corrected as shown below:

Column 2, line 37, the word "nonacid-modified", insert a hyphen to read -- non-acid-modified --. Column 8, lines 7, 28 and 59, the symbol "$\mu$" should be -- m$\mu$ --. Column 9, lines 5, 26, 40, 60 and 75, the symbol "$\mu$" should be -- m$\mu$ --. Column 10, lines 21, 52 and 64, the symbol "$\mu$" should be -- m$\mu$ --. Claim 1, line 31, the term "$A^{116}$" should be -- $A^-$ --.

Signed and sealed this 10th day of October 1972.

(SEAL)
Attest:

EDWARD M. FLETCHER, JR.              ROBERT GOTTSCHALK
Attesting Officer                    Commissioner of Patents